United States Patent
Malinge

(10) Patent No.: US 7,019,090 B2
(45) Date of Patent: Mar. 28, 2006

(54) CATALYTIC COMPONENT FOR THE POLYMERIZATION OF OLEFINS OBTAINED BY IMPREGNATION OF A PREPOLYMER WITH A SOLUTION OF A CATALYTIC COMPONENT, PREPOLYMER OBTAINED FROM THE CATALYTIC COMPONENT AND POLYMERIZATION PROCESS USING SAID CATALYTIC COMPONENT

(75) Inventor: Jean Malinge, Loubieng (FR)

(73) Assignee: Total Petrochemicals France, Puteaux (FR)

( * ) Notice: Subject to any disclaimer, the term of this patent is extended or adjusted under 35 U.S.C. 154(b) by 90 days.

(21) Appl. No.: 10/379,728

(22) Filed: Mar. 6, 2003

(65) Prior Publication Data

US 2003/0171208 A1    Sep. 11, 2003

Related U.S. Application Data

(60) Division of application No. 08/953,296, filed on Oct. 17, 1997, now Pat. No. 6,551,956, which is a continuation of application No. 08/405,655, filed on Mar. 17, 1995, now abandoned.

(30) Foreign Application Priority Data

Mar. 24, 1994   (FR)   .................... 94 03420

(51) Int. Cl.
    *C08F 4/42*   (2006.01)
(52) U.S. Cl. .............. 526/113; 526/160; 526/943; 526/124.2; 526/124.3; 502/113; 502/104; 502/108; 502/152
(58) Field of Classification Search ........... 526/160, 526/943, 124.2, 124.3, 113; 502/113, 104, 502/108, 152
See application file for complete search history.

(56) References Cited

U.S. PATENT DOCUMENTS

| | | | |
|---|---|---|---|
| 5,120,696 | A | 6/1992 | Tsutsui et al. |
| 5,122,583 | A | 6/1992 | Ewen et al. |
| 5,266,544 | A | 11/1993 | Tsutsui et al. |
| 5,556,893 | A | 9/1996 | Costa et al. |
| 5,756,613 | A | 5/1998 | Costa et al. |
| 5,804,524 | A | 9/1998 | Reddy et al. |

FOREIGN PATENT DOCUMENTS

| | | |
|---|---|---|
| EP | 0 439 964 | 8/1991 |
| EP | 0 447 071 A1 * | 9/1991 |
| EP | 0 452 920 | 10/1991 |
| EP | 0 452 920 A2 * | 10/1991 |
| EP | 0 563 917 | 10/1993 |
| EP | 0 627447 | 12/1994 |
| EP | 0 518 092 | 3/1998 |
| EP | 0 295 312 | 12/1998 |
| JP | SHO 63 (1988)-89509 | 4/1988 |
| WO | WO 95/26369 | 10/1995 |

* cited by examiner

*Primary Examiner*—Ling-Sui Choi
(74) *Attorney, Agent, or Firm*—Smith, Gambrell and Russell, LLP

(57) ABSTRACT

The present invention relates to a catalytic component for the polymerization of olefins combining a number of catalytic components for the polymerization of olefins and to a process for preparing it. The catalytic component according to the invention is obtained by impregnation of a prepolymer with a solution of a catalytic component for the polymerization of olefins. The invention brings about control of the combination of different catalytic components and provides for improvement in the control of the quality of the polymers manufactured by virtue of the catalytic action of the combined catalytic components. Another advantage of the invention is to be able to control the morphology and the particle size distribution of the polymers by choosing the morphology of a single catalytic component. The prepolymer and the polymer obtained from the catalytic component according to the invention are also subjects of the present invention.

10 Claims, 1 Drawing Sheet

CATALYTIC COMPONENT FOR THE POLYMERIZATION OF OLEFINS OBTAINED BY IMPREGNATION OF A PREPOLYMER WITH A SOLUTION OF A CATALYTIC COMPONENT, PREPOLYMER OBTAINED FROM THE CATALYTIC COMPONENT AND POLYMERIZATION PROCESS USING SAID CATALYTIC COMPONENT

The present application is a divisional of Ser. No. 08/953,296, filed Oct. 17, 1997, now U.S. Pat. No. 6,551,956 B1 which is a continuation of Ser. No. 08/405,655, filed Mar. 17, 1995 (abandoned) which prior application is incorporated in its entirety herein by reference.

BACKGROUND OF THE INVENTION

The present invention relates to a catalytic component for the polymerization of olefins combining a number of catalytic components for the polymerization of olefins, and to a process for preparing it. The catalytic component according to the invention is capable of being obtained by impregnation of a prepolymer with a solution of a catalytic component for the polymerization of olefins. The prepolymer obtained by prepolymerization of at least one olefin in the presence of the catalytic component according to the invention is also a subject of the present invention. The polymer obtained by polymerization of at least one olefin in the presence of the prepolymer according to the invention or of the catalytic component according to the invention is also a subject of the present invention.

Catalytic component is understood to mean, generally and in particular in the present application, an ingredient of a catalytic system for the polymerization of olefins, the said ingredient containing a transition metal and the said transition metal being active for the polymerization of olefins. The transition metal is known as active for the polymerization of olefins when the catalytic component which contains it catalyses the polymerization of olefins, if appropriate also by virtue of the presence in the polymerization medium of other ingredients of the said catalytic system. By way of example, the titanium contained in a conventional catalytic component of Ziegler-Natta type containing titanium, chlorine and magnesium atoms is the transition metal and is active for the polymerization of olefins. In fact, this type of catalytic component catalyses the polymerization of olefins by virtue of the titanium and also by virtue of the presence in the polymerization medium of a cocatalyst, in general an organic aluminium derivative, which is another ingredient of the catalytic system of which the catalytic component containing the titanium forms part.

The term prepolymerization is used to denote polymerization leading to a prepolymer. Prepolymer is generally understood to mean the active hydrocarbon solid or polymer obtained by prepolymerization of at least one olefin in the presence of a catalytic component, this solid representing not more than ten percent of the mass of the polymer which it is finally desired to synthesize by polymerization of at least one olefin in the presence of the said prepolymer. Generally, the kinetics of prepolymerization are controlled by controlling the flow rate of the olefin(s) intended to be prepolymerized. Generally, the degree of progression of the prepolymerization is less than or equal to 10,000 grams of prepolymer per millimole of active transition metal contained in the catalytic component from which the prepolymer has resulted. This degree of progression is calculated by taking into account the total polymer mass contained in the prepolymer. Thus, if the catalytic component contains a polymer, the degree of progression is calculated by determining the sum of the polymer mass formed during the prepolymerization and the polymer mass contained in the starting catalytic component and by then dividing this sum by the number of moles of transition metal contained in the starting catalytic component. The use of the term prepolymer necessarily implies that the prepolymer under consideration is active for the polymerization of olefins, that is to say that it catalyses the polymerization of olefins, if appropriate in the presence of a suitable cocatalyst, which can be of the same nature as the cocatalyst used during the polymerization which has led to the prepolymer.

The combination of a number of catalytic components for the polymerization of olefins has already been attempted. The document EP 0,439,964 A2 describes the preparation of solid catalytic components containing both a component based on Mg, Cl and Ti and a derivative of a transition metal, the said metal having a cycloalkadiene group for ligand. This type of component leads to polymers with broadened molecular mass distributions.

Patent U.S. Pat. No. 5,032,562 describes the preparation of polyolefins with multimodal molecular mass distributions by virtue of the use of a catalytic component comprising a magnesium derivative containing Mg—OR bonds, a zirconium derivative and $TiCl_4$.

Patent Application EP 447,070 A1 teaches that a catalytic component prepared by impregnation of $MgCl_2$ with two electron donors, then addition of a zirconium metallocene and then addition of $TiCl_4$ leads, on polymerization, to a polymer with the bimodal molecular mass distribution.

Document EP 452,920 teaches that it is possible to carry out a prepolymerization in the presence of a catalytic component containing both a transition metal bonded to a group with the cyclopentadienyl skeleton non-bridged to another group with the cyclopentadienyl skeleton and a compound containing an Al—O bond, and then to bring the prepolymer thus obtained into contact with a derivative of a transition metal comprising at least two ligands each comprising a cyclopentadienyl skeleton, the two ligands being connected to each other by a divalent radical. Polymerization of olefins in the presence of the product thus obtained has a narrow composition distribution and a good melt strength.

BRIEF DESCRIPTION OF THE DRAWINGS

The invention is described by the following non-limiting FIGS. 1 and 2 which present graphic analysis of relative concentrations and molecular masses.

DESCRIPTION OF THE INVENTION

Figure 1:
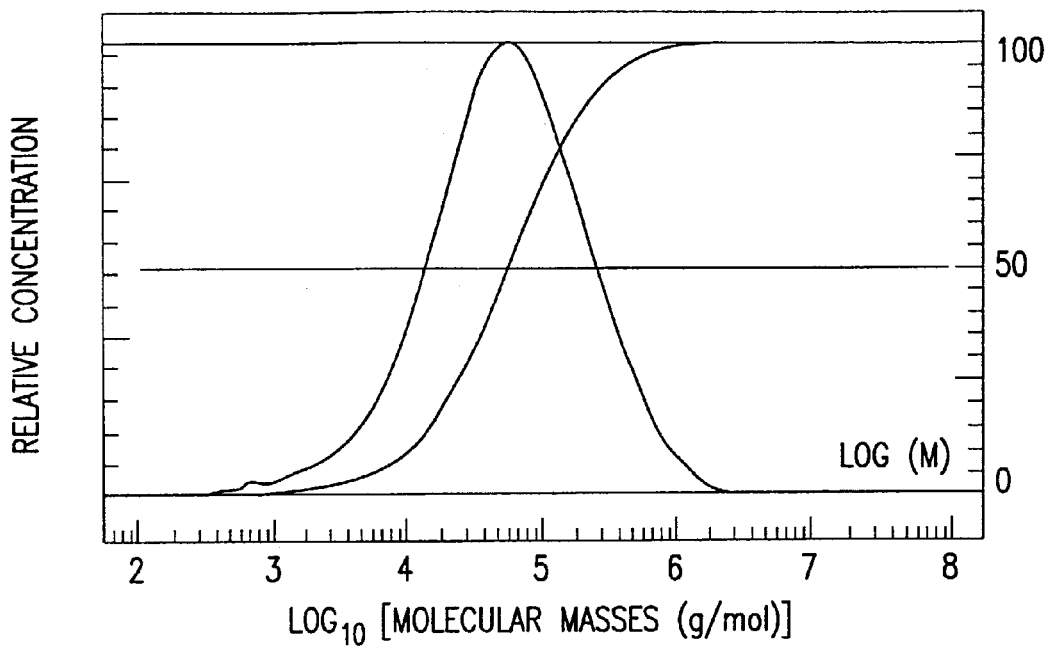

The Applicant Company has discovered that the combination of catalytic components, as described in the prior art, has the disadvantage of not leading to the molecular mass distributions which are expected on the basis of the molecular mass distributions of the polymers obtained by the use of the catalytic components taken individually, that is to say not in combination. Thus, in the distribution curve of the molecular masses of a polymer obtained by polymerization in the presence of a catalytic component combining a number of different catalytic components directly brought into contact, without prepolymerization before this operation of bringing into contact, one peak or one shoulder per combined catalytic component is generally observed but, for a given peak, the size of this peak is not proportional to the amount used of the combined catalytic component which is the source of the peak, on the basis of the activity of this catalytic component when it is used individually.

The present invention relates to a new catalytic component for the polymerization of olefins and to a process for preparing it. This catalytic component is capable of being obtained by impregnation, using a solution of a catalytic component B, of a prepolymer A obtained by prepolymerization A of at least one olefin in the presence of a catalytic component A, the latter being solid.

The catalytic component according to the invention thus combines a catalytic component B with the catalytic component A from which the prepolymer A has resulted.

The catalytic component according to the invention, also known in the following as catalytic component AB, leads to the polymers expected on the basis of the individual catalytic behaviour of each catalytic component, that is to say the catalytic component A used alone, on the one hand, and the catalytic component B used alone, on the other hand.

The invention thus brings about control of the combination of different catalytic components and provides for improvement in the control of the quality of the polymers manufactured by virtue of the catalytic action of the combined catalytic components.

Another advantage of the invention is to be able to control the morphology and the size distribution of polymer particles by choosing the morphology of the catalytic component A. The morphology of the polymer particles is a morphological replica of the particles of catalytic component AB, which are themselves a morphological replica of the catalytic component A.

Thus, by way of example, if it is desired to manufacture a polymer of substantially spherical shape, it will be sufficient to choose a prepolymer A of substantially spherical shape, without the nature of the catalytic component B substantially influencing the morphology of the final polymer. As the morphology of the prepolymer A is itself substantially a replica of the catalytic component A, it will be advisable, in the hypothesis mentioned, to choose a catalytic component A of substantially spherical shape.

The transition metals contained in the catalytic components which the present application is concerned with, whether catalytic components intended to be combined or, consequently, the catalytic component according to the invention, can be chosen from the elements of groups 3b, 4b, 5b, 6b, 7b or 8, the lanthanides or the actinides of the periodic classification of the elements, as defined in the Handbook of Chemistry and Physics, sixty-first edition, 1980–1981. These transition metals are preferably chosen from titanium, vanadium, hafnium, zirconium or chromium.

The components and prepolymers described in the document EP 452,920 A2 and the processes described in this document for preparing these components and prepolymers are excluded from the field of the present invention.

The catalytic component according to the invention is capable of being obtained by a process comprising, a—the manufacture of a prepolymer by prepolymerization A in the presence of a solid catalytic component A, then b—the impregnation of the said prepolymer with a solution of a catalytic component B, the component A and the component B not being such that at the same time the component A comprises a group with the cyclopentadienyl skeleton and a compound containing an Al—O bond, and the component B comprises two ligands each comprising a cyclopentadienyl skeleton connected to each other by a divalent radical.

In order to carry out this process, it is also possible to choose the component A and the component B so that they are not such that at the same time the component A comprises a group with the cyclopentadienyl skeleton and the component B comprises a group with the cyclopentadienyl skeleton.

In order to carry out this process, it is also possible to choose the component A and the component B so that they are not such that at the same time the component A comprises a group with the cycloalkadienyl skeleton and the component B comprises a group with the cycloalkadienyl skeleton.

In order to carry out this process, the component A and the component B can also contain different transition metals.

The prepolymer A can result from different types of catalytic component A.

The catalytic component A must be solid. It can be of Ziegler-Natta type. Any commercially-available solid catalytic component of Ziegler-Natta type may be suitable. By way of example, a catalytic component of Ziegler-Natta type can be provided in the form of a complex containing at least Mg, Ti and Cl, the titanium being in the Ti(IV) and/or at least Ti(III) chlorinated form, and can optionally contain an electron donor or acceptor.

A catalytic component of Ziegler-Natta type is generally the result of the combination of at least one titanium compound, one magnesium compound, chlorine and optionally one aluminium compound and/or at least one electron donor or acceptor, and any other compound which can be used in this type of component.

The titanium compound is generally chosen from chlorinated titanium compounds of formula $Ti(OR)_xCl_{4-x}$ in which R represents an aliphatic or aromatic hydrocarbon radical containing from one to fourteen carbon atoms or represents $COR^1$ with $R^1$ representing an aliphatic or aromatic hydrocarbon radical containing from one to fourteen carbon atoms and x represents an integer ranging from 0 to 3.

The magnesium compound is generally chosen from compounds of formula $Mg(OR^2)_nCl_{2-n}$ in which $R^2$ represents hydrogen or a linear or cyclic hydrocarbon radical and n represents an integer ranging from 0 to 2.

The chlorine present in the component of Ziegler-Natta type can arise directly from the titanium halide and/or from the magnesium halide. It can also arise from an independent chlorinating agent such as hydrochloric acid or an organic halide such as butyl chloride.

The electron donor or acceptor is a liquid or solid organic compound known for taking part in the composition of these catalytic components. The electron donor can be a mono- or polyfunctional compound advantageously chosen from aliphatic or aromatic carboxylic acids and their alkyl esters, aliphatic or cyclic ethers, ketones, vinyl esters, acrylic derivatives, in particular alkyl acrylates or alkyl methacrylates, and silanes such as aromatic, alicyclic or aliphatic alkoxysilanes. Particularly suitable as electron donor are the compounds such as methyl para-toluate, ethyl benzoate, ethyl acetate or butyl acetate, ethyl ether, ethyl para-anisate, dibutyl phthalate, dioctyl phthalate, diisobutyl phthalate, tetrahydrofuran, dioxane, acetone, methyl isobutyl ketone, vinyl acetate, methyl methacrylate, phenyltriethoxysilane, cyclohexylmethyldimethoxysilane and dicyclopentyldimethoxysilane. The electron acceptor is a Lewis acid, preferably chosen from aluminium chloride, boron trifluoride, chloranil or alternatively alkylaluminium, haloalkylaluminium and alkylmagnesium compounds.

The catalytic component A can be a chromium(VI) oxide deposited on an inert substrate such as silica.

The catalytic component A can be any solid catalytic component combining different catalytic components.

The catalytic component A can be a prepolymer.

The catalytic component A can be a prepolymer obtained by prepolymerization of at least one olefin in the presence of a catalytic component according to the invention.

The solvent of the solution of the catalytic component B can be chosen from non-protic and preferably non-polar solvents. The solvent of the said solution can be chosen from aliphatic or alicyclic hydrocarbons such as, for example, cyclohexane, hexane or heptane or can be chosen from aromatic hydrocarbons such as benzene, xylene, ethylbenzene or toluene. Toluene is a preferred solvent.

The catalytic component B must be chosen from catalytic components which are soluble in the solvent chosen from those mentioned above. The catalytic component B can be chosen from the compounds of formula $ML_x$ in which M represents a transition metal, L represents a ligand coordinated to the transition metal and x is equal to the valency of the transition metal. The transition metal M has as many ligands L, which can be identical or- different, as its valency. At least one ligand L is a group with the skeleton of cycloalkadienyl type, that is to say either the cycloalkadienyl group itself or a substituted cycloalkadienyl group, for example substituted by a hydrocarbon group. When the compound of formula $ML_x$ contains at least two groups with the skeleton of cycloalkadienyl type, at least two of these groups can be bonded to each other by a divalent radical.

At least one ligand L can be chosen from the groups of formula —O—, —S—, —NR$^3$— or —PR$^3$—, one of the free valencies of which is bonded to the transition metal atom M and the other free valency of which is bonded to a divalent radical, itself bonded to a ligand L with the cycloalkadienyl skeleton, in which R$^3$ represents hydrogen or a group chosen from the silyl, alkyl or aryl groups, the last two groups optionally being halogenated.

At least one ligand L can be chosen from the groups of formula —OR$^4$, —SR$^4$, —NR$^4_2$ or —PR$^4_2$, the free valency of which is bonded to a divalent radical, itself bonded to a ligand L with the cycloalkadienyl skeleton, in which R$^4$ represents hydrogen or a group chosen from the silyl, alkyl or aryl groups, the last two groups optionally being halogenated.

Each divalent radical can be an alkylene radical, such as the methylene radical (—CH$_2$—), the ethylene radical (—CH$_2$CH$_2$—) or the trimethylene radical (—CH$_2$CH$_2$CH$_2$—), it being possible for this alkylene radical also to be substituted, for example by at least one hydrocarbon group, such as the isopropylidene radical. This divalent radical can be a silylene group (—SiH$_2$—) which is optionally substituted, for example by at least one hydrocarbon group, as is the case for the dimethylsilylene or diphenylsilylene radical.

The ligands L with the cycloalkadienyl skeleton preferably have a cyclopentadienyl skeleton, that is to say are cyclopentadienyl groups or are substituted cyclopentadienyl groups, such as, for example, the fluorenyl group or the indenyl group.

Ligands L different from those mentioned above can be hydrocarbon groups containing from 1 to 12 carbon atoms, alkoxide groups, halogens or hydrogen. Mention may be made, as hydrocarbon group, of alkyl, cycloalkyl, aryl or aralkyl groups, which includes the methyl, ethyl, propyl, isopropyl, butyl, cyclopentyl, cyclohexyl, phenyl, tolyl and benzyl groups. Mention may be made, as alkoxide group, of the methoxy, ethoxy, butoxy or phenoxy groups. Mention may be made, as halogen, of fluorine, chlorine, bromine or iodine.

The catalytic component B can be a mixture of a number of compounds of formula $ML_x$.

By way of example, the catalytic component B can be chosen from the following compounds: bis(cyclopentadienyl)dichlorozirconium, ethylenebis(4,5,6,7-tetrahydro-1-indenyl)dichlorozirconium, ethylenebis(indenyl)dichlorozirconium, isopropylidene(cyclopentadienyl, fluorenyl)dichlorozirconium, dimethylsilyl(3-tert-butyl-cyclopentadienyl, fluorenyl)dichlorozirconium, bis(cyclopentadienyl)dimethylzirconium, ethylenebis(4,5,6,7-tetrahydro-1-indenyl)dimethylzirconium, ethylenebis(indenyl)dimethylzirconium, isopropylidene (cyclopentadienyl, fluorenyl)dimethylzirconium, dimethylsilyl(3-tert-butyl-cyclopentadienyl, fluorenyl) dimethylzirconium, dimethylsilyl(tetramethylcyclopentadienyl, tert-butylamino)dichlorozirconium, the latter compound having the formula $(CH_3)_2Si((CH_3)_4C_5, (CH_3)_3CN)ZrCl_2$, dimethylsilyl(tetramethylcyclopentadienyl, tert-butylamino)dimethyltitanium, this compound having the formula $(CH_3)_2Si((CH_3)_4C_5, (CH_3)_3CN)Ti(CH_3)_2$.

The catalytic component B is preferably chosen from the compounds of formula $ML_x$ in which M represents zirconium, titanium or hafnium.

Impregnation of the prepolymer A with the solution of the catalytic component B can be carried out by steeping the prepolymer A in the solution of the catalytic component B, preferably with stirring. A suspension S is thus formed containing the solid particles of prepolymer A, the liquid of this suspension consisting of the solution of the catalytic component B. It is preferably advisable for the catalytic component B to be at such a concentration in its solution that all the prepolymer A steeps in the said solution. The suspension S generally contains at least two litres of liquid per kg of prepolymer A.

The impregnation of the prepolymer A with the solution of the catalytic component B can also be carried out by addition of the solution of the catalytic component B to the prepolymer A. In order for this impregnation to be homogeneous, it is preferable to stir the prepolymer A and to slowly add the solution of the catalytic component B during this operation.

After having carried out the impregnation, for example by one of the means which have just been described, the solvent is preferably removed, which can be carried out by drying. This drying operation can be carried out between 20 and 100° C., preferably between 20 and. 60° C., under a purge of an inert and dry gas such as nitrogen and under partial or high vacuum or at atmospheric pressure.

The catalytic component according to the invention can be used directly in the polymerization of at least one olefin. However, in the case where morphological control of the final polymer is important, it is preferable to carry out a prepolymerization AB in the presence of the catalytic component according to the invention, before the polymerization. This prepolymerization AB is preferably carried out in the gas phase.

The prepolymer AB capable of being obtained after the prepolymerization AB is also a subject of the present invention. It is possible to balance the relative influence of the components A and B by varying the amounts of each of these components. Generally, the degree of prepolymerization A is between 0.5 and 500 grams per millimole of transition metal contributed by the catalytic component A. In the event of recourse to a prepolymerization AB, the degree of progression of the prepolymerization AB is preferably between 0.5 and 1000 grams per millimole of transition metal contributed by the catalytic component A and the catalytic component B.

Polymers can be obtained by polymerization of at least one olefin in the presence of the prepolymer AB according to the invention.

The olefins which can be used, either for the prepolymerizations or for the polymerization, are α-olefins containing from two to eight carbon atoms, such as ethylene or propylene, or their mixtures. The terms polymerization and prepolymerization which are made use of in the present application therefore cover copolymerization reactions. Preference is given, among α-olefin mixtures, to a mixture of ethylene and of at least one α-olefin containing from three to eight carbon atoms, the percentage of ethylene in the mixture generally being greater than 90% by weight.

The prepolymerizations A and AB can be carried out by prepolymerization of the abovementioned olefins by virtue of suspension or gas-phase polymerization processes.

The polymerizations in the presence of a catalytic component AB or in the presence of a prepolymer AB can be carried out by polymerization of the abovementioned olefins by virtue of bulk, solution, suspension or gas-phase polymerization processes, the last two processes being preferred.

The bulk, solution, suspension or gas-phase polymerization processes are well known in their principle to those skilled in the art.

A bulk polymerization process consists in carrying out a polymerization in at least one of the olefins to be polymerized maintained in the liquid or hypercritical state.

The solution or suspension polymerization processes consist in carrying out a polymerization in solution or in suspension in an inert medium and especially in an aliphatic hydrocarbon.

For a solution polymerization process, it is possible to use, for example, a hydrocarbon containing from eight to ten carbon atoms or a mixture of these hydrocarbons. For a suspension polymerization process, it is possible to use, for example, n-heptane, n-hexane, isohexane or isobutane.

The operating conditions for these bulk, solution, suspension or gas-phase polymerization processes are those which are generally proposed for similar cases requiring conventional catalytic systems of supported or non-supported Ziegler-Natta type.

For example, for a suspension or solution polymerization process, it is possible to carry out the reaction at temperatures ranging up to 250° C. and under pressures ranging from atmospheric pressure to 250 bars. In the case of a polymerization process in liquid propylene medium, the temperatures can range up to the critical temperature and the pressures can be between atmospheric pressure and the critical pressure. For a bulk polymerization process leading to polyethylenes or to copolymers mostly made of ethylene, it is possible to carry out the reaction at temperatures of between 130° C. and 350° C. and under pressures ranging from 200 to 3500 bars.

A gas-phase polymerization process can be implemented using any reactor which makes possible a gas-phase polymerization and in particular in a stirred bed and/or fluidized bed reactor.

The conditions under which the gas-phase polymerization is carried out, especially temperature, pressure, injection of the olefin or olefins into the stirred bed and/or fluidized bed reactor, and control of the polymerization temperature and pressure are analogous to those proposed in the prior art for the gas-phase polymerization of olefins. The reaction is generally carried out at a temperature less than the melting point M.p. of the polymer or prepolymer to be synthesized and more particularly between +20° C. and (M.p. −5)° C., and under a pressure such that the olefin or olefins are essentially in the vapour phase.

The solution, suspension, bulk or gas-phase polymerization processes can involve a chain-transfer agent, so as to control the melt index of the prepolymer or polymer to be produced. The preferred chain-transfer agent is hydrogen, which is used in an amount which can range up to 90%, and which preferably lies between 0.1 and 60%, of the volume of the combined olefins and hydrogen conveyed to the reactor.

The prepolymerizations A and AB are preferably carried out at a controlled monomer flow rate, it being possible for the said flow rate to be between 0.1 and 500 g/h/millimole of transition metal contributed respectively by the catalytic component A and the catalytic component AB.

The prepolymerization and polymerization reactions take place in particular by virtue of the presence of transition metals contained in the catalytic components or prepolymers present during the said prepolymerization and polymerization.

According to the nature of the catalytic components and therefore of the transition metals which the latter contain, it will be appropriate to introduce cocatalysts necessary for the desired prepolymerizations or polymerizations. The role of these cocatalysts is well known to those skilled in the art. Their presence in the prepolymerization and/or polymerization medium may be necessary in order to activate the transition metals resulting from the catalytic components used.

Generally, the prepolymer contains the same transition metals as the catalytic component from which the said prepolymer has resulted after prepolymerization in the presence of the said catalytic component. Likewise, a polymer obtained without prepolymerization, in the presence of a catalytic component, contains the same transition metals as the catalytic component from which it has resulted.

Thus, if the presence of a cocatalyst was necessary to activate a transition metal contained in a catalytic component during a prepolymerization, the presence of a cocatalyst, which can be of the same nature, will also be necessary during the polymerization in the presence of this prepolymer because these are the same transition metals which it is advisable to activate at the prepolymerization and at the polymerization.

In consequence:

during a prepolymerization A, at least one cocatalyst capable of activating the transition metal(s) contributed by the catalytic component A must be present in the prepolymerization A medium, during a prepolymerization AB, at least one cocatalyst capable of activating the transition metal(s) contributed by the catalytic component A and the transition metal(s) contributed by the catalytic component B must be present in the prepolymerization AB medium, during a polymerization, at least one cocatalyst capable of activating the transition metal(s) contributed by the catalytic component A and the transition metal(s) contributed by the catalytic component B must be present in the polymerization medium.

The presence of the cocatalyst(s) in the prepolymerization or polymerization media can be provided by adding the cocatalyst(s) to the prepolymerization or polymerization media. This addition can be carried out at the beginning of the prepolymerization or polymerization.

The presence of the cocatalyst(s) in the prepolymerization or polymerization media can also be provided, before prepolymerization or polymerization, by impregnation of the catalytic component or of the prepolymer in the presence of which it is desired to carry out the prepolymerization or polymerization.

Moreover, it is also possible to introduce, during the prepolymerization AB, the amount of cocatalyst subsequently necessary for the polymerization. If the operation is thus carried out, the prepolymer AB can contain a sufficient amount of cocatalyst for it to be no longer necessary to introduce cocatalyst during the polymerization.

Moreover, it is also possible to introduce, during the prepolymerization A, the amount of cocatalyst subsequently necessary for the prepolymerization AB. If the operation is thus carried out, the prepolymer A can contain a sufficient amount of cocatalyst for it to be no longer necessary to introduce cocatalyst during the prepolymerization AB.

Moreover, it is also possible to introduce, during the prepolymerization A, the amount of cocatalyst subsequently necessary for the polymerization and for the optional prepolymerization AB. If the operation is thus carried out, the prepolymer A can contain a sufficient amount of cocatalyst for it to be no longer necessary to introduce cocatalyst during the polymerization and during the optional prepolymerization AB.

If a catalytic component containing magnesium, chlorine and titanium atoms is used as catalytic component A, use will preferably be made, as cocatalyst during the prepolymerization A, during the optional prepolymerization AB and during the polymerization, of an organic aluminium derivative in the prepolymerization and polymerization media.

This organic aluminium derivative can be a derivative of formula $R^1R^2R^3Al$ in which $R^1$, $R^2$ and $R^3$, which can be identical or different, each represent either a hydrogen atom or a halogen atom or an alkyl group containing from 1 to 20 carbon atoms, at least one of $R^1$, $R^2$ or $R^3$ representing an alkyl group. Mention may be made, as an example of a suitable compound, of ethylaluminium dichloride or dibromide or dihydride, isobutylaluminium dichloride or dibromide or dihydride, diethylaluminium chloride or bromide or hydride, di-n-propylaluminium chloride or bromide or hydride, or diisobutylaluminium chloride or bromide or hydride. In preference to the abovementioned compounds, use is made of a trialkylaluminium such as tri-n-hexylaluminium, triisobutylaluminium, trimethylaluminium or triethylaluminium.

The cocatalyst can also be an aluminoxane. This aluminoxane can be linear, of formula

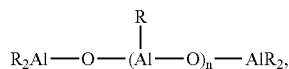

or cyclic of formula

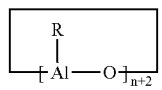

R representing an alkyl radical comprising from one to six carbon atoms and n being an integer ranging from 2 to 40, preferably from 10 to 20. The aluminoxane can contain R groups of different nature. The R groups preferably all represent methyl groups. Moreover, cocatalyst is also understood to mean mixtures of the abovementioned compounds.

In the case where a compound of formula $ML_x$ is used as catalytic component B, it is preferable to use at least one aluminoxane as cocatalyst, if appropriate simultaneously with other cocatalysts, in particular when the nature of the catalytic component A makes it necessary, during the optional prepolymerization AB and during the polymerization.

In the case where a compound of formula $ML_x$ is used as catalytic component B, it is possible to use, as cocatalyst of this component, a compound capable of generating, under the conditions of polymerization and of optional prepolymerization AB, a cationic species derived from the catalytic component B. By way of example, N,N-dimethylanilinium tetra(pentafluorophenyl)borate, that is to say $(CH_3)_2(C_6H_5)NH^+ B(C_6F_5)_4^-$ is a cocatalyst of bis(cyclopentadienyl)dimethylzirconium, that is to say of $Cp_2Zr(CH_3)_2$, because a cationic species of formula $Cp_2ZrCH_3^+ B(C_6F_5)_4^-$ is formed during the polymerization and/or prepolymerization.

If a catalytic component containing magnesium, chlorine and titanium atoms is used as catalytic component A and if a compound of formula $ML_x$ is used as catalytic component B, it may be sufficient to introduce, as cocatalyst during the prepolymerization A, during the optional prepolymerization AB and during the polymerization, an aluminoxane into the prepolymerization and polymerization media, because this type of compound is capable of activating titanium and the transition metal M.

The amounts of cocatalyst used, whether during a prepolymerization or during the polymerization, must be sufficient to activate the transition metal(s). Generally, when an organic aluminium derivative is used as cocatalyst, an amount of it is introduced such that the atomic ratio of the aluminium contributed by the cocatalyst to the transition metal(s) which it is desired to activate ranges from 0.5 to 10,000 and preferably from 1 to 1,000.

At least one electron donor can be added to the prepolymerizations or polymerizations. This electron donor can be, for example, chosen from Lewis bases, esters and polyesters of oxygen-containing acids, ethers and polyethers, amines, silicon compounds such as silanes and alkylalkoxysilanes of formula $SiR^1R^2(OR)_2$, $SiR^1(OR)_3$ or $SiR^1R^2R^3 (OR)$, R, $R^1$, $R^2$ and $R^3$, which can be identical or different, being hydrocarbon groups containing from 1 to 12 carbon atoms, and from phosphorus compounds such as phosphates and phosphonates, the preferred compounds being aromatic acid alkyl esters or polyesters, alkyl mono- or diethers, alkoxysilanes and alkylalkoxysilanes.

In the following examples, the characteristics of the prepolymers and of the polymers synthesized were determined by the following techniques:
Number-average molecular mass (represented by Mn) and weight-average molecular mass (represented by Mw) of the polymers:

the polymers were characterized by steric exclusion chromatography using a refractometric detection analytical system similar to that described in D. Lecacheux, Journal of Applied Polymer Science, Volume 217, 4867 (1982). The calculations were carried out from molecular masses resulting from polystyrene calibration and corrected by virtue of the laws of Mark Houwink. The polymolecularity of the polymers can be evaluated by calculating the Mw/Mn ratio.

Mean diameter of the polymer particles, (represented by D50): diameters below which are found 50% by mass of the particles Distribution of the particle sizes:
they are evaluated by calculating a parameter known as SPAN using the following formula:

SPAN=(D90−D10)/D50,

D90, D50 and D10 representing diameters below which are found respectively 90%, 50% and 10% by mass of the particles.

In the case of the prepolymer and solid catalytic component particles, D90, D50 and D10 are determined by means of a Malvern 1600 laser particle sizer. In the case of the polymer particles, D90, D50 and D10 are determined by sieving.

Melt indices: ASTM standard 1238. MI$_2$, MI$_5$ and MI$_{21}$ represent the weight of polymer passed in 10 minutes through a standardized die at 190° C. and under a weight respectively of 2.1 kg, 5 kg and 21 kg.

In Table 1, Ti and Zr represent respectively the titanium and zirconium contents of the prepolymers AB, expressed in ppm. In Table 1, $C_{Zr}$ represents the molar percentage of zirconium contained in the prepolymers AB with respect to all the transition metals (titanium and zirconium) contained in the same prepolymers AB.

The examples which follow involve either a catalytic component containing zirconium or a catalytic component containing titanium or two of these types of catalytic component. When these two transition metals (zirconium and titanium) are simultaneously present during a polymerization, the polymers obtained have a bimodal molecular mass distribution, it being possible for the peak of the low masses to be attributed to the catalytic components containing the zirconium and it being possible for the peak of the high masses to be attributed to the catalytic components containing titanium. These attributions are deduced from the observation of the distributions of the molecular masses of the polymers obtained with each of these catalytic components tested individually in polymerization.

The expression "%LMexp" represents the percentage by weight of low molecular masses contained in the polymer, it being understood that the said low molecular masses correspond to the molecular masses of the peak attributed to the action of zirconium. Thus, when only a catalytic component containing zirconium is used, the %LMexp is equal to 100%. On the other hand, when a catalytic component containing zirconium and a catalytic component containing titanium were combined, the %LMexp represents the percentage of the molecular masses corresponding to a single peak of the bimodal distribution of the molecular masses; it concerns the peak in the direction of the low masses.

The expression "%LMth" represents the percentage (known as theoretical) by weight of low molecular masses calculated from the observation of the catalytic behaviour of each of the catalytic components when they are used individually in prepolymerization and then polymerization or directly in polymerization.

The "%LMth" is intended to be compared with the "%LMexp" at comparable polymerization conditions.

The %LMth is calculated from the following formula:

$$\% \, LMth = \frac{C_{Zr} \cdot P_{Zr}}{C_{Zr} \cdot P_{Zr} + C_{Ti} \cdot P_{Ti}} \cdot 100$$

in which $C_{Zr}$ represents the molar percentage of zirconium contained in the prepolymers AB or catalytic components AB introduced at the polymerization with respect to all the transition metals (titanium and zirconium) contained in the same prepolymers or catalytic components, $C_{Ti}$ represents the molar percentage of titanium contained in the prepolymers AB or catalytic Components AB introduced at the polymerization with respect to all the transition metals (titanium and zirconium) contained in the same prepolymers or catalytic components, $P_{Zr}$ represents the polymerization productivity of a prepolymer or of a catalytic component containing only zirconium as transition metal, the said productivity being expressed in gram of polymer produced per millimole of zirconium, and $P_{Ti}$ represents the polymerization productivity of a prepolymer or of a catalytic component containing only titanium as transition metal, the said productivity being expressed in gram of polymer produced per millimole of titanium.

Table 1 compares %LMexp with %LMth by the %LMexp/%LMth ratio.

Examples 1 to 5 illustrate the invention. Example 1 shows in particular that substantially spherical polymer and prepolymer particles are obtained by virtue of the use of a substantially spherical catalytic component A.

For Examples 2 to 5, the %LMexp/%LMth ratios are close to unity, which indicates that each catalytic component in the prepolymer according to the invention was able to play its expected catalytic role.

Examples 7 to 11 are comparative examples. Examples 7 to 9 show that a strong difference between the %LMexp and the %LMth is obtained when two catalytic components are combined according to the prior art.

Examples 10 and 11 describe the action of each of the catalytic components taken individually.

EXAMPLE 1

Suspension Synthesis of a Prepolymer A Followed by Gas-Phase Synthesis of a Prepolymer AB 0.75 litre of hexane, 0.6 ml of a solution of methylaluminoxane in toluene marketed by the company Witco, the said solution containing 4.58 mol of aluminium per litre of solution, and 2.41 g of a catalytic component A prepared like Catalyst 2 of Example 1 of the French patent application filed under Number 86 FR-004413, the said component containing 2.2% by weight of titanium and 20.6% by weight of magnesium, being substantially spherical in morphology, and having a D50 of 37 μm and a SPAN of 0.48, are introduced with stirring at 60° C. and under a nitrogen atmosphere into a 2.5 litre double-jacketed reactor equipped with a stirrer and with temperature control. The reactor is pressurized with 1 bar of nitrogen, still at 60° C., and is then supplied with a controlled ethylene flow for one hour so as, by a prepolymerization A, to obtain 120 g of a prepolymer A. The degree of progression of the prepolymerization A was therefore 50 g of prepolymer per gram of catalytic component A, that is to say 109 g of prepolymer per gram of catalytic component A, that is to say 109 g of prepolymer per millimol of titanium contained in the catalytic component A.

After having decompressed the reactor and removed the hexane by sweeping with nitrogen, a solution of a catalytic component B consisting of 5 ml of a solution of $ZrCp_2Cl_2$ and methylaluminoxane in toluene, these 5 ml containing 0.24 g of $ZrCp_2Cl_2$ (or 0.82 millimol of $ZrCp_2Cl_2$), Cp representing a cyclopentadienyl group, these 5 ml also containing 0.72 ml of the methylaluminoxane solution described above, so that the Al/Zr atomic ratio is in this instance substantially equal to 4, is added dropwise, under nitrogen and with slow stirring, to the dry prepolymer A over approximately 5 minutes. The toleune is removed by sweeping with nitrogen at atmospheric pressure at 60° C. A catalytic component AB impregnated with methylaluminoxane is thus obtained. The reactor is again pressurized with 1 bar of nitrogen and is supplied with a controlled ethylene flow for one hour in order to prepare, by prepolymerization AB at 60° C., 265 g of prepolymer AB. The degree of progression of the prepolymerization AB is therefore 100 g of prepolymer per gram of catalytic component (A and $ZrCp_2Cl_2$), that is to say 137 g of prepolymer per millimole of transition metal (Ti+Zr) contained in the catalytic component AB. After cooling the reactor, the prepolymer AB is isolated under an inert atmosphere.

The prepolymer AB has a substantially spherical morphology. It contains 200 ppm of titanium and 282 ppm of zirconium. The mean diameter of the particles D50 is in the region of 165 μm. The particle size distribution is narrow since a SPAN of 0.46 is determined.

Gas-Phase Synthesis of a Polymer 100 grams of a dry polyethylene powder arising from a polymerization identical to that now described and then 2.1 ml of the methylaluminoxane solution described above are introduced under a nitrogen atmosphere at 75° C. with stirring at 400 revolutions per minute into a dry, 8 litre, double-jacketed reactor equipped with a stirrer and a temperature control. The reactor is pressurized with 2 bars of nitrogen, 6 bars of hydrogen and 8 bars of ethylene. 8 grams of the prepolymer AB whose synthesis has just been described are then introduced via an airlock and by pressurizing with nitrogen and injection of nitrogen is continued until a pressure of 21 bars in the reactor is obtained. The pressure is maintained at this value by injection of ethylene.

After reacting for three hours, the polymerization is halted by halting the ethylene supply and the reactor is decompressed, purged with nitrogen and cooled. 1,003 grams of polymer (this value excludes the 100 grams of dry polyethylene powder charged to the reactor before polymerization) of substantially spherical morphology were thus produced. The productivity was therefore 17,176 g of polyethylene per millimole of transition metal (Ti+Zr). The polymer obtained has the following characteristics:

D50=715 μm

SPAN=0.22

Apparent density=0.46 g/cm$^3$

Melt index=$MI_2$=1.1; $MI_5/MI_2$=3.7

Mn=1,450 g/mol

Mw=113,500 g/mol

Mw/Mn=78

EXAMPLE 2

Suspension Synthesis of a Prepolymer 0.7 litre of toluene, 3 ml of the solution of methylaluminoxane in toluene described in Example 1, and 311 mg of a catalytic component A prepared like the catalytic powder of Example 1 of the Belgian patent application published under Number BE-867,400, the said component containing 15.4% by weight of titanium and 5.5% by weight of magnesium, are introduced with stirring at 40° C. and under a nitrogen atmosphere into a 1 litre double-jacketed reactor equipped with a stirrer and a temperature control. The reactor is pressurized with 1 bar of nitrogen, still at 40° C., and it is then supplied with a controlled ethylene flow for one hour so as to obtain a prepolymerization A, the degree of which is 50 g of prepolymer per gram of catalytic component A, that is to say 15.4 grams of prepolymer per millimole of titanium.

After having decompressed the reactor, the addition is carried out, under nitrogen and with slow stirring, of 0.5 ml of a solution in toluene containing 3.5 mg of $ZrCp_2Cl_2$, Cp representing a cyclopentadienyl group, and 0.01 ml of the methylaluminoxane solution described above, so that the Al/Zr atomic ratio is substantially equal to 4.

The reactor is again pressurized with 1 bar of nitrogen and is supplied with a controlled ethylene flow for one hour so that in total, taking into account the prepolymerization A, the overall degree of prepolymerization, that is to say the degree of prepolymerization AB, is 100 g of polymer per gram of catalytic component (A and $ZrCp_2Cl_2$), that is to say 31 g of polymer per millimole of transition metal (Ti+Zr). After cooling the reactor, the prepolymer AB is isolated under an inert atmosphere.

Suspension Synthesis of a Polymer 1.5 litre of hexane, 2 ml of the solution of methylaluminoxane in toluene described above (i.e. 9.16 millimol of aluminium) and 2.4 g of the prepolymer AB whose synthesis has just been described are introduced under nitrogen at room temperature into a 4 litre double-jacketed reactor equipped with a stirrer and a temperature control. The reactor is pressurized with 2 bars of nitrogen and then 4 bars of hydrogen. After heating to 80° C., ethylene is introduced until a total pressure of 13 bars is obtained. The total pressure is kept constant by addition of ethylene for 3 hours. Injection of ethylene is then halted and the reactor is cooled to 25° C. The transition metals contained in the polymer are deactivated by addition of a methanolic acid solution. The polymer is then isolated after evaporation of the volatile species and drying. 367 grams of polymer were thus produced.

The results are collated in Table 1.

EXAMPLE 3

The preparation is carried out as for Example 2, except that, for the synthesis of the prepolymer AB, 292 mg of catalytic component A and 9.3 mg of $ZrCp_2Cl_2$ are introduced (in place of the 311 mg of catalytic component A and 3.5 mg of $ZrCp_2Cl_2$ of Example 2).

Figure 2:
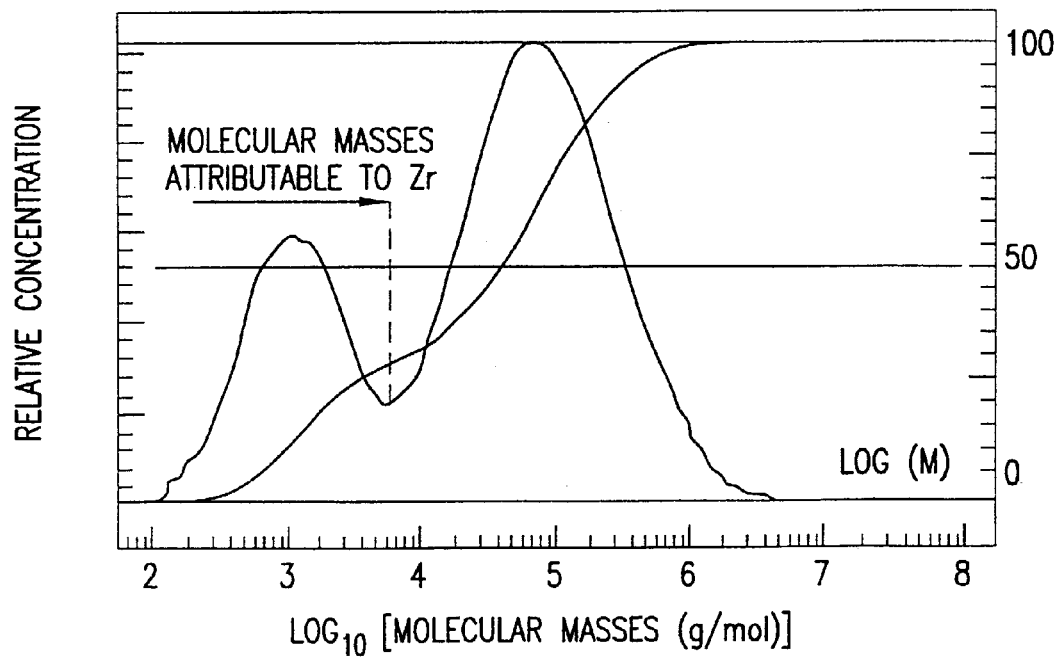

FIG. 2 gives the molecular mass distribution of the polymer obtained. The other results are collated in Table 1.

EXAMPLE 4

The preparation is carried out as for Example 2, except that, for the synthesis of the prepolymer AB, 302 mg of catalytic component A and 19.7 mg of $ZrCp_2Cl_2$ are introduced (in place of the 311 mg of catalytic component A and 3.5 mg of ZrCp$_2$Cl$_2$ of Example 2). The results are collated in Table 1.

EXAMPLE 5

The preparation is carried out as for Example 2, except that, for the synthesis of the prepolymer AB, 264 mg of catalytic component A and 24.2 mg of ZrCp$_2$Cl$_2$ are introduced (in place of the 311 mg of catalytic component A and 3.5 mg of ZrCp$_2$Cl$_2$ of Example 2). The results are collated in Table 1.

EXAMPLE 6 COMPARATIVE

Suspension Synthesis of a Prepolymer 0.7 litre of toluene, 3 ml of the solution of methylaluminoxane in toluene described in Example 1, 341 mg of a catalytic component A prepared like the catalytic powder of Example 1 of the Belgian patent application published under Number BE-867,400, the said component containing 15.4% by weight of titanium and 5.5% by weight of magnesium, and 0.5 ml of a solution in toluene containing 3.9 mg of ZrCp$_2$Cl$_2$ and 0.012 ml of the solution of methylaluminoxane in toluene described in Example 1 are introduced with stirring at 40° C. and under a nitrogen atmosphere into a 1 litre double-jacketed reactor equipped with a stirrer and a temperature control. The reactor is pressurized with 1 bar of nitrogen and it is then supplied with a controlled ethylene flow for 1 hour so as to obtain a degree of prepolymerization of 100 grams of prepolymer per gram of catalytic component (A+ZrCp$_2$Cl$_2$), that is to say 30.7 g of prepolymer per millimole of transition metal (Zr+Ti).

After cooling the reactor, the prepolymer is isolated by filtration and drying.

Suspension Synthesis of a Polymer

The polymerization is carried out analogously to that of Example 2 but with the prepolymer whose synthesis has just been described. The results are collated in Table 1.

EXAMPLE 7 COMPARATIVE

The preparation is carried out as for Example 6, except that, for the synthesis of the prepolymer, 267 mg of catalytic component A and 4.1 mg of ZrCp$_2$Cl$_2$ are introduced (in place of the 341 mg of catalytic component A and 3.9 mg of ZrCp$_2$Cl$_2$ of Example 6). The results are collated in Table 1.

EXAMPLE 8 COMPARATIVE

The preparation is carried out as for Example 6, except that, for the synthesis of the prepolymer, 315 mg of catalytic component A and 15.5 mg of ZrCp$_2$Cl$_2$ are introduced (in place of the 341 mg of catalytic component A and 3.9 mg of ZrCp$_2$Cl$_2$ of Example 6). The results are collated in Table 1.

EXAMPLE 9 COMPARATIVE

The preparation is carried out as for Example 6, except that, for the synthesis of the prepolymer, 265 mg of catalytic component A and 24.9 mg of ZrCp$_2$Cl$_2$ are introduced (in place of the 341 mg of catalytic component A and 3.9 mg of ZrCp$_2$Cl$_2$ of Example 6). The results are collated in Table 1.

EXAMPLE 10 COMPARATIVE

Suspension Synthesis of a Prepolymer 0.7 litre of toluene, 3 ml of the solution of methylaluminoxane in toluene described in Example 1, and 310 mg of a catalytic component A prepared by the catalytic powder of Example 1 of the Belgian Patent Application published under Number BE-867,400, the said component containing 15.4% by weight of titanium and 5.5% by weight of magnesium, are introduced with stirring at 40° C. and under a nitrogen atmosphere into a 1 litre double-jacketed reactor equipped with a stirrer and a temperature control. The reactor is pressurized with 1 bar of nitrogen, still at 40° C., and it is then supplied with a controlled ethylene flow for one hour so as to obtain a prepolymerization, the degree of which is 100 g of polymer per gram of catalytic component A, that is to say 31 g of polymer per millimole of titanium.

After cooling the reactor, the prepolymer is isolated by filtration and dried.

Suspension Synthesis of a Polymer

The polymerization is carried out analogously to that of Example 2 but with the prepolymer whose synthesis has just been described. FIG. 1 gives the molecular mass distribution of the polymer obtained. The results are collated in Table 1.

EXAMPLE 11 COMPARATIVE

Suspension Synthesis of a Prepolymer 0.7 litre of toluene, 3 ml of the solution of methylaluminoxane in toluene described in Example 1, and 5 ml of a solution in toluene containing 24 mg of ZrCp$_2$Cl$_2$ and 0.07 ml of the solution of methylaluminoxane in toluene described in Example 1 are introduced with stirring at 40° C. and under a nitrogen atmosphere into a 1 litre double-jacketed reactor equipped with a stirrer and a temperature control. The reactor is pressurized with 1 bar of nitrogen, still at 40° C., and is then supplied with a controlled ethylene flow for one hour so as to obtain a prepolymerization, the degree of which is 1,500 grams of prepolymer per gram of ZrCp$_2$Cl$_2$, that is to say 438 g of prepolymer per millimole of zirconium.

After cooling the reactor, the prepolymer is isolated by filtration and dried.

Suspension Synthesis of a Polymer

The polymerization is carried out analogously to that of Example 2 but with the prepolymer whose synthesis has just been described. The results are collated in Table 1.

EXAMPLE 12

0.7 litre of toluene, 3 ml of the solution of methylaluminoxane in toluene described in Example 1, and 1.51 g of a catalytic component A prepared like the catalytic powder of Example 1 of the Belgian Patent Application published under Number BE-867,400, the said component containing 15.4% by weight of titanium and 5.5% by weight of magnesium, are introduced with stirring at 60° C. and under a nitrogen atmosphere into a 1 litre double-jacketed reactor equipped with a stirrer and a temperature control. The reactor is pressurized with 1 bar of nitrogen, still at 60° C., and it is then supplied with a controlled ethylene flow for one hour so as to obtain 75 grams of prepolymer A. The degree of progression of the prepolymerization A is, in this instance, 50 grams of prepolymer A per gram of catalytic component A, or 15.5 grams of prepolymer A per millimole of titanium contained in the catalytic component A.

After having decompressed the reactor and removed the solvent at 60° C. under an absolute pressure of 2,000 pascals, a solution in toluene of $ZrCp_2Cl_2$ containing 10 millilitres of toluene and 11 mg of $ZrCp_2Cl_2$, Cp representing a cyclopentadienyl group, is added over five minutes under nitrogen and with slow stirring. After stirring for 15 minutes, the solvent is removed under an absolute pressure of 2,000 pascals. A catalytic component AB containing 3,060 ppm of titanium and 45 ppm of zirconium, i.e. $C_{Zr}$=0.76 mol %, is then available.

1.2 grams of the catalytic component AB whose preparation has just been described are used under the polymerization conditions of Example 2. 343 grams of polymer are then obtained, i.e. 4,450 grams of polymer per millimole of titanium and zirconium. The polymer has the following characteristics: Mn=7,020 g/mol, Mw=156,000 g/mol, Mw/Mn=22, %LMexp=9%. The %LMexp value is equal to the %LMth value.

TABLE 1

| | ANALYSIS OF THE PREPOLYMER USED IN POLYMERIZATION | | | ANALYSIS OF THE POLYMER | | | | | | PRODUCTIVITY (g of polymer |
|---|---|---|---|---|---|---|---|---|---|---|
| | Ti (ppm) | Zr (ppm) | $C_{Zr}$ (molar %) | Mn (g/mole) | Mw (g/mole) | Mw/Mn | % LMexp | % LMth | % LMexp/ % LMth | per mmol of Ti + Zr) |
| EXAMPLE 2 | 1,523 | 35 | 1.2 | 5,086 | 140,900 | 27.7 | 14 | 14 | 1 | 4,640 |
| EXAMPLE 3 | 1,492 | 97 | 3.3 | 2,512 | 124,700 | 49.6 | 30 | 31 | 0.97 | 4,940 |
| EXAMPLE 4 | 1,446 | 191 | 6.5 | 2,314 | 168,700 | 73 | 43 | 47 | 0.91 | 13,410 |
| EXAMPLE 5 | 1,411 | 261 | 8.9 | 1,552 | 105,200 | 68 | 50 | 56 | 0.89 | 15,400 |
| EXAMPLE 6 | 1,523 | 35 | 1.2 | 7,950 | 159,000 | 20 | 7 | 14 | 0.50 | 4,550 |
| EXAMPLE 7 | 1,517 | 47 | 1.6 | 5,480 | 143,500 | 26 | 12 | 18 | 0.67 | 4,400 |
| EXAMPLE 8 | 1,468 | 146 | 5 | 2,840 | 121,800 | 43 | 24 | 41 | 0.59 | 4,700 |
| EXAMPLE 9 | 1,408 | 267 | 9.1 | 2,250 | 121,500 | 54 | 32 | 57 | 0.56 | 10,700 |
| EXAMPLE 10 | | | 0 | 17,830 | 126,300 | 7.1 | 0 | 0 | | 4,140 |
| EXAMPLE 11 | | | 100 | 790 | 1,200 | 1.5 | 100 | 100 | | 54,000 |

The invention claimed is:

1. A catalyst obtained by the process for the manufacture of a prepolymerized catalytic composition for the polymerization of olefins comprising:
   a—the manufacture of a first prepolymer by prepolymerizing at least one first olefin in the presence of a solid catalyst A, then
   b—the impregnation of the said first prepolymer with a solution of a catalyst B, then
   c—the prepolymerization of at least one second olefin in the presence of the impregnated first prepolymer to form the catalyst;
   wherein the solid catalyst A contains magnesium, chlorine and titanium atoms, and the prepolymerization in the presence of catalyst A is carried out in the presence of a cocatalyst;
   wherein the catalyst B is selected from compounds of formula $ML_x$ in which M represents a transition metal, x represents a number equal to the valency of the transition metal and L represents a ligand coordinated to the transition metal, at least one ligand L being a group with cycloalkadienyl skeleton;
   the catalyst A and the catalyst B containing a transition metal and the catalyst A and the catalyst B being different and not being such that at the same time:
   the catalyst A comprises a group with a cycloalkadienyl skeleton, and
   the catalyst B comprises a group with a cycloalkadienyl skeleton.

2. Process comprising prepolymerisation at least one olefin in presence of a catalyst obtained by the process for the manufacture of a catalyst for the polymerization of olefins comprising:
   a—the manufacture of a first prepolymer by prepolymerizing at least one olefin in the presence of a solid catalyst A, then
   b—the impregnation of the said first prepolymer with a solution of a catalyst B, then
   c—the prepolymerization of at least one second olefin in the presence of the impregnated first prepolymer to form the catalyst;
   wherein the solid catalyst A contains magnesium, chlorine and titanium atoms, and the prepolymerization in the presence of catalyst A is carried out in the presence of a cocatalyst;
   wherein the catalyst B is selected from compounds of formula $ML_x$ in which M represents a transition metal, x represents a number equal to the valency of the transition metal and L represents a ligand coordinated to the transition metal, at least one ligand L being a group with cycloalkadienyl skeleton;
   the catalyst A and the catalyst B containing a transition metal and the catalyst A and the catalyst B being different and not being such that at the same time:
   the catalyst A comprises a group with a cycloalkadienyl skeleton, and
   the catalyst B comprises a group with a cycloalkadienyl skeleton.

3. Process according to claim 2, wherein it is carried out in gas phase or in suspension.

4. Process according to claim 2, wherein an aluminoxane is present in the prepolymerization.

5. Process comprising polymerizing at least one third olefin in the presence of the catalyst of claim 1.

6. A catalyst for polymerizing olefins, made by a process comprising:
   preparing a first prepolymer by prepolymerizing at least one first olefin in the presence of a solid catalyst A and a co-catalyst, wherein the solid catalyst A contains at least one transition metal;
   impregnating the first prepolymer with a solution of a catalyst B, selected from compounds having a formula $ML_x$, in which M represents a transition metal, x represents a number equal to the valency of the transition metal, and L represents a ligand coordinated to the transition metal, at least one ligand L being a group with a modified or unmodified cycloalkadienyl, and preparing a second prepolymer by prepolymerizing at least one second olefin in the presence of the impregnated first prepolymer to form the catalyst;

with the proviso that catalyst A and catalyst B are different and that, if catalyst A comprises a group with a modified or unmodified cyclopentadienyl and a compound containing an Al—O bond, then catalyst B does not comprise two ligands each comprising a modified or unmodified cyclopentadienyl connected to each other by a divalent radical; and that, if catalyst B comprises two ligands each comprising a modified or unmodified cyclopentadienyl connected to each other by a divalent radical, then catalyst A does not simultaneously contain a group with a modified or unmodified cyclopentadienyl and a compound containing an Al—O bond.

7. A prepolymerization process comprising prepolymerizing at least one olefin in the presence of a catalyst for polymerizing olefins, made by a process comprising:

preparing a prepolymer by prepolymerizing at least one olefin in the presence of a solid catalyst A and a co-catalyst, wherein the solid catalyst A contains at least one transition metal; and then, impregnating the prepolymer with a solution of a catalyst B, selected from compounds having a formula $ML_x$, in which M represents a transition metal, x represents a number equal to the valency of the transition metal, and L represents a ligand coordinated to the transition metal, at least one ligand L being a group with a modified or unmodified cycloalkadienyl, with the proviso that catalyst A and catalyst B are different and that, if catalyst A comprises a group with a modified or unmodified cyclopentadienyl and a compound containing an Al—O bond, then catalyst B does not comprise two ligands each comprising a modified or unmodified cyclopentadienyl connected to each other by a divalent radical; and that, if catalyst B comprises two ligands each comprising a modified or unmodified cyclopentadienyl connected to each other by a divalent radical, then catalyst A does not simultaneously contain a group with a modified or unmodified cyclopentadienyl and a compound containing an Al—O bond.

8. The process according to claim 7, wherein the process is carried out in gas phase or in suspension.

9. The process according to claim 7, wherein the process is carried out in the presence of an aluminoxane.

10. A polymerization process comprising polymerizing at least one third olefin in the presence of the catalyst of claim 6.

* * * * *